Jan. 2, 1945.  P. E. GATES  2,366,609
LAMP FLARE MACHINE
Filed Feb. 21, 1942
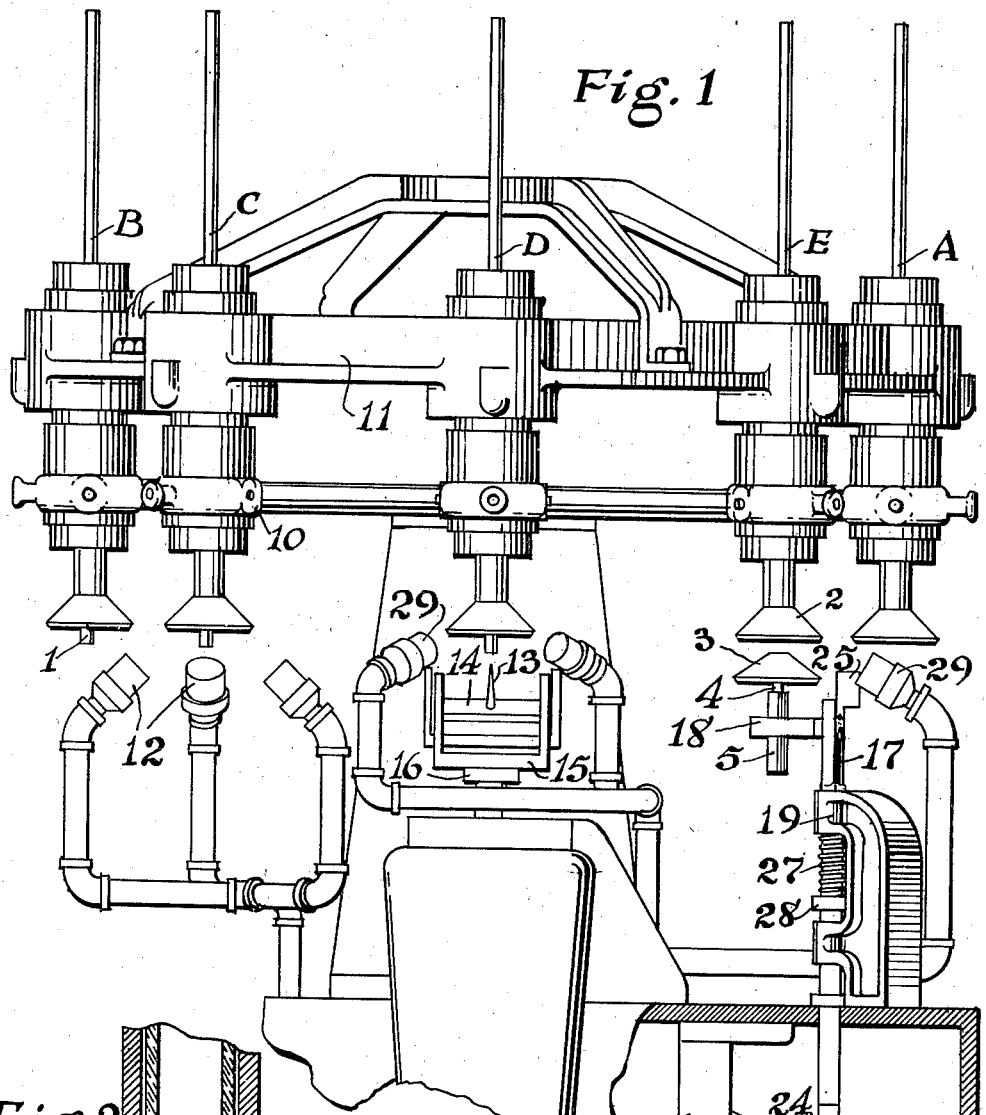
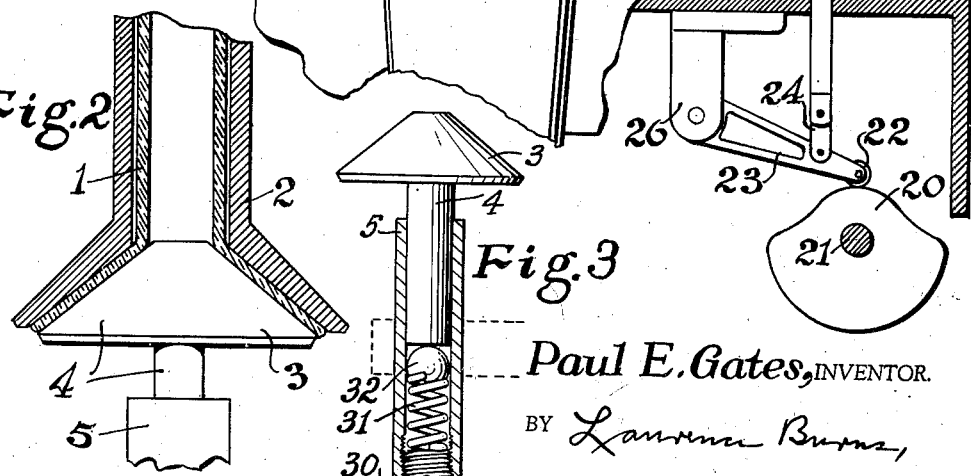
Paul E. Gates, INVENTOR.
BY Lawrence Burns,
ATTORNEY Patented Jan. 2, 1945

2,366,609

UNITED STATES PATENT OFFICE 2,366,609

LAMP FLARE MACHINE

Paul E. Gates, Danvers, Mass., assignor to Sylvania Electric Products Inc., a corporation of Massachusetts Application February 21, 1942, Serial No. 431,863

1 Claim. (Cl. 49—7)

The present invention relates to the manufacture of electric lamps and more specifically to an improved means for making flares suitable for use in fluorescent lamps. It has been found necessary to have flares for fluorescent lamps more accurate in their angular disposition and more uniform in size than those generally used in other types of lamps. The flare must not be warped, sagged or otherwise out of shape. Flanging mechanism consisting of a rotating pencil tends to create a corrugated effect longitudinally on the wall of the cone. This effect is further exaggerated by the sagging of the semi-moulten glass.

The object of my invention is to make possible the production of flares whose conical portion is firmly fashioned to a specific pre-determined angle.

Another object of my invention is to have the flares of equal size and equal wall thickness.

A further object is to have the walls of more perfect conical shape and free from irregularities.

Still further objects and advantages of my invention will be apparent from the following specification and drawing in which:

Figure 1 is a side elevation of a flare machine to which my invention may be adapted.

Figure 2 is a cross section of the mould with the glass element therein.

Figure 3 is a view of the plunger and the mechanism on which it is mounted.

My invention may be incorporated into an automatic flare machine, for example, the type described in the United States Patent, No. 1,546,353. In this type of machine, depicted in Figure 1, a series of chucks 10 each holding a piece of glass tubing 1 are mounted on a carrier 11 and intermittently rotated through a series of positions by the means disclosed in said patent. The glass is rotated about its own axis by the chucks 10 and about an external axis by the carrier 11. In various positions a sequence of operations are performed on the end of the glass tubing held in each of the chucks. I have found it desirable to attach to the nethermost extremity of each chuck assembly, a mould 2 through which the glass tubing will protrude a sufficient distance to be heated and worked. The function of said mold is hereinafter described.

Thus the machine is loaded at position A as a suitable mechanism loosens the chuck at that position allowing the glass tubes to be dropped a pre-determined distance through it. The carrier 11 thus rotates counter clockwise, around the back of the machine to position C through B. At the positions thereafter the flare forming takes place. First the fires 12 heat the lower extremity of the tubing 1 to a semi-moulten state. Then in position D the pre-heated glass is further heated and worked by the pencil 13 seated in the stirrup 14 which is pivotally mounted on the standards 15 which are fastened to the member 16. The means used to cause the stirrup to rotate and swing out on an angle from its axis may be similar to the means disclosed in Patent Number 1,546,353. By this means the flaring of the end of the tube has previously been accomplished.

However, flares made in this manner have been found to vary greatly in both size and precision of their conical shape. I have, therefore, found it necessary to add moulding mechanism, while still retaining the original mechanism as a means for working the moulten glass into a shape in which it may readily be adapted to the mould. In position E where the partially flared end of tubing 1 is encased between the mould 2 and the plunger 3 it is formed to uniform size, angle and wall thickness. The conveyor continues the cycle from position E to position A where the tubing is lowered, and through the intermittent positions from A to B where the finished flare is cut off, thus preparing the tubing for a repetition of the cycle.

The plunger 3 is mounted on pin 4 which is in turn freely mounted in the tubular member 5. The member 18 adjustably supports tubular member 5 from member 17. A carbon disulfide fire 29 keeps the plunger at a proper temperature and prevents it from sticking to the glass. The shield 25 is fixed to rod 17 so that the plunger is never in the line of the fire and is not heated to excess.

The cam 20 rotates on the shaft 21 which is driven by any suitable means. The cam roller 22 rides on said cam causing arm 23 to pivot in its support 26 imparting a vertical reciprocating motion through the link 24 to the rod 17. This allows the plunger which is in register with the mould to press the glass into said mould thereby securing the desired form. Member 19 supports member 17. The ring 28 is fixed to the rod 17 so that tension on the spring 27 insures the roller 22 following the cam 20.

Figure 2 is a cross section of the mould 2, showing the end of the glass tube 1 in proper relationship to the plunger 3 for the flare forming operation.

When this operation takes place the glass is in a semi-moulten state, and is rotating as is the mould. Therefore it is necessary that the upward thrust of the plunger 3 should be controlled so that it comes into contact with the glass without undue friction. This control is exerted by the automatic regulating mechanism shown in Figure 3. The plunger 3 which is a cone of 105° is affixed the top of the rod 4 which is in turn fitted into the tube 5 and rests on the bearing 32. Thus when the plunger comes in contact with the glass and its rotary motion is imparted to the plunger it may move freely. The spring 31 automatically controls the pressure exerted on the moulten glass by contracting when more pressure than is necessary to form the glass is applied. The headless screw 30 tapped into the tube 5 holds the spring 31 in place and makes it possible to adjust the tension with which the spring will operate.

What I claim is:

Apparatus for forming flares from elongated glass tubing, said apparatus including; a rotatively mounted support for said tubing; a heating unit mounted adjacent said support in such a manner as to direct its heating effect to an end portion of tubing held by said support; an initial flange forming member in the form of a rotarily swingable finger mounted for relative movement with respect to said support to provide a preliminary form in the flange through a line contact only; and a finish forming moulding unit for said flange comprising a recessed sleeve of truncated conical form in said support and a plunger member formed to fit the inside of said cone and mounted for relative movement toward and away from said support and also for rotation on an axis in alignment with the axis of rotation of said support whereby the previously formed flange in said tubing may be finish moulded through surface area contact between said recessed portion and said plunger member.

PAUL E. GATES.